(12) United States Patent
Suen et al.

(10) Patent No.: US 8,799,489 B2
(45) Date of Patent: Aug. 5, 2014

(54) MULTI-USER SYSTEM WITH DYNAMIC DATA SOURCE SELECTION

(75) Inventors: Edward Shaw-Lee Suen, San Francisco, CA (US); Sunil Prabhakar Dixit, Redwood City, CA (US)

(73) Assignee: Siebel Systems, Inc., Redwood Shores, CA (US)

( * ) Notice: Subject to any disclaimer, the term of this patent is extended or adjusted under 35 U.S.C. 154(b) by 1156 days.

(21) Appl. No.: 10/186,328

(22) Filed: Jun. 27, 2002

(65) Prior Publication Data
US 2007/0226339 A1 Sep. 27, 2007

(51) Int. Cl.
*G06F 15/16* (2006.01)

(52) U.S. Cl.
USPC .......................................... 709/229

(58) Field of Classification Search
CPC ......... H04L 63/08; H04L 67/02; H04L 67/28; H04L 67/2814; H04L 67/2833; H04L 63/10; H04L 63/0815; H04L 63/101; G06F 17/30221; G06F 21/31
USPC .......................................... 707/3–5; 709/229
See application file for complete search history.

(56) References Cited

U.S. PATENT DOCUMENTS

| | | | | |
|---|---|---|---|---|
| 4,774,655 A * | 9/1988 | Kollin et al. | | 707/4 |
| 5,504,890 A * | 4/1996 | Sanford | | 707/3 |
| 5,511,186 A * | 4/1996 | Carhart et al. | | 707/2 |
| 5,550,971 A * | 8/1996 | Brunner et al. | | 707/3 |
| 5,564,113 A * | 10/1996 | Bergen et al. | | 707/4 |
| 5,678,041 A * | 10/1997 | Baker et al. | | 709/229 |
| 5,701,453 A * | 12/1997 | Maloney et al. | | 707/2 |
| 5,761,662 A * | 6/1998 | Dasan | | 707/10 |
| 5,806,057 A * | 9/1998 | Gormley et al. | | 707/1 |
| 5,864,843 A * | 1/1999 | Carino et al. | | 709/226 |
| 5,864,874 A * | 1/1999 | Shapiro | | 707/201 |
| 5,884,312 A * | 3/1999 | Dustan et al. | | 707/10 |
| 5,899,991 A * | 5/1999 | Karch | | 707/5 |
| 5,905,984 A * | 5/1999 | Thorsen | | 707/9 |
| 5,926,808 A * | 7/1999 | Evans et al. | | 707/3 |
| 5,956,727 A * | 9/1999 | Cheng et al. | | 707/102 |
| 5,978,799 A * | 11/1999 | Hirsch | | 707/4 |

(Continued)

FOREIGN PATENT DOCUMENTS

WO WO 9967917 A1 * 12/1999 ............... H04L 9/00
WO WO 01/22292 * 3/2001

OTHER PUBLICATIONS

U.S. Appl. No. 60/154,885.*

(Continued)

*Primary Examiner* — Christopher Biagini
(74) *Attorney, Agent, or Firm* — Eric A. Stephenson

(57) ABSTRACT

Techniques to dynamically select data sources for users and to direct queries for the users to the proper data sources. Initially, user information (e.g., user name) for each user is received and used to determine a data source designated for the user. The designated data source may be determined via a look-up table or by running a query with the user information to obtain the identity (e.g., the logical name) of the data source. A data source variable for each user can then be set to the identity of the designated data source. Thereafter, queries for each user are directed to the user's designated data source by determining database connection information for the designated data source based on the data source variable and using this information to direct the queries.

17 Claims, 8 Drawing Sheets

(56) References Cited

U.S. PATENT DOCUMENTS

| | | | |
|---|---|---|---|
| 6,004,276 A * | 12/1999 | Wright et al. | 600/508 |
| 6,018,733 A * | 1/2000 | Kirsch et al. | 707/3 |
| 6,023,694 A * | 2/2000 | Kouchi et al. | 707/2 |
| 6,076,108 A * | 6/2000 | Courts et al. | 709/227 |
| 6,085,191 A * | 7/2000 | Fisher et al. | 707/9 |
| 6,094,654 A * | 7/2000 | Van Huben et al. | 707/8 |
| 6,115,709 A * | 9/2000 | Gilmour et al. | 707/9 |
| 6,182,068 B1 * | 1/2001 | Culliss | 707/5 |
| 6,263,330 B1 * | 7/2001 | Bessette | 709/203 |
| 6,275,820 B1 * | 8/2001 | Navin-Chandra et al. | 707/3 |
| 6,275,939 B1 * | 8/2001 | Garrison | 707/10 |
| 6,351,747 B1 * | 2/2002 | Urazov et al. | 707/10 |
| 6,357,010 B1 * | 3/2002 | Viets et al. | 726/4 |
| 6,366,915 B1 * | 4/2002 | Rubert et al. | 707/10 |
| 6,374,237 B1 * | 4/2002 | Reese | 707/3 |
| 6,480,894 B1 * | 11/2002 | Courts et al. | 709/227 |
| 6,487,552 B1 * | 11/2002 | Lei et al. | 707/4 |
| 6,502,193 B1 * | 12/2002 | Barber | 726/4 |
| 6,618,808 B1 * | 9/2003 | Johnson et al. | 726/4 |
| 6,643,648 B1 * | 11/2003 | Ross et al. | 707/9 |
| 6,668,246 B1 * | 12/2003 | Yeung et al. | 705/57 |
| 6,744,729 B2 * | 6/2004 | Tinsley et al. | 370/230 |
| 6,807,574 B1 * | 10/2004 | Partovi et al. | 709/224 |
| 6,907,423 B2 * | 6/2005 | Weil et al. | 707/3 |
| 7,310,633 B1 * | 12/2007 | Wang et al. | 707/3 |
| 2002/0002559 A1 * | 1/2002 | Busa | 707/104.1 |
| 2002/0103876 A1 * | 8/2002 | Chatani et al. | 709/217 |
| 2002/0133504 A1 * | 9/2002 | Vlahos et al. | 707/104.1 |
| 2003/0061215 A1 * | 3/2003 | Messina | 707/9 |
| 2003/0115318 A1 * | 6/2003 | Wueste | 709/224 |
| 2003/0154406 A1 * | 8/2003 | Honarvar et al. | 713/201 |
| 2003/0187848 A1 * | 10/2003 | Ghukasyan et al. | 707/9 |
| 2003/0204501 A1 * | 10/2003 | Moon | 707/3 |
| 2004/0068486 A1 * | 4/2004 | Chidlovskii | 707/3 |
| 2005/0044064 A1 * | 2/2005 | Haase | 707/3 |
| 2008/0077598 A1 * | 3/2008 | Wilmering et al. | 707/100 |
| 2008/0215557 A1 * | 9/2008 | Ramer et al. | 707/4 |

OTHER PUBLICATIONS

Query optimization in the presence of limited access pattern, Daniela Florescu, Alon Levy, Ioana Manolescu, Dan Suciu, vol. 28, Issue 2 (Jun. 1999) table of contents, pp. 311-322, Year of Publication: 1999, ISBN:1-58113-084-8.*

On Answering Queries in the Presence of Limited Access Patterns, Chen Li et al., Lecture Notes in Computer Science Publisher: Springer Berlin / Heidelberg, Jan. 2001, ISSN: 0302-9743.*

Annie Chen, Eric Chou, Joshua Wong, Andrew Y. Yao, Qing Zhang, Shao Zhang, Amir Michail, "CVSSearch: Searching through Source Code using CVS Comments," icsm, p. 364, 17th IEEE International Conference on Software Maintenance (ICSM'01), 2001.*

GeneX: An Open Source gene expression database and integrated tool set, H. Mangalam, J. Stewart, J. Zhou, K. Schlauch, M. Waugh, G. Chen, A. D. Farmer, G. Colello, J. W. Weller, IBM Systems Journal, vol. 40, pp. 552-569, No. 2, 2001.*

Irrigation information in the Internet Deininger, A. and Stein, T.M. 1999 Proceedings of the International Symposium-cum-Workshop "Sustainable Agriculture and Rural Development", Symposium, Cairo, Nov. 1999, p. 141-150.*

Mery R. Thompson et al., Certificate-based authorization policy in a PKI environment, Nov. 2003.*

Chaudhuri, S. and Dayal, U. 1997. Data warehousing and OLAP for decision support. In Proceedings of the 1997 ACM SIGMOD international Conference on Management of Data (Tucson, Arizona, United States, May 11-15, 1997). J. M. Peckman, S. Ram, and M. Franklin, Eds. SIGMOD '97. ACM, New York, NY, 507-508.*

Chaudhuri, S. and Dayal, U. 1997. An overview of data warehousing and OLAP technology. SIGMOD Rec. 26, 1 (Mar. 1997), 65-74.*

"Database vs. Data Warehouse", Posted by Nishith under Data Warehousing, Wed Nov. 2, 2005 http://opensourceanalytics.com/2005/11/02/database-vs-data-warehouse/.*

* cited by examiner

DSN Look-up Table

| User ID | Data Source Name (DSN) |
|---|---|
| JAdams | MYDB1 |
| LAkiko | MYDB2 |
| FBerry | MYDB1 |
| KHiroko | MYDB2 |
| TJones | MYDB1 |
| AKuyama | MYDB2 |
| ASmith | MYDB1 |
| LSchmidt | MYDB3 |
| ⋮ | ⋮ |

*FIG. 4*

MULTI-USER SYSTEM WITH DYNAMIC DATA SOURCE SELECTION

BACKGROUND OF THE INVENTION

The present invention relates generally to computer processing, and more particularly to techniques for dynamically selecting data sources for users in a multi-user computer system and which are especially suited for analytics applications.

Business enterprises are often inundated with vast amounts of data that may be stored in a number of different data sources. Each data source may be designated to store certain data (e.g., for a particular subject area) and/or may be designated to cover a particular geographical region or locale. For example, an enterprise may maintain three different data sources to store online analytical processing (OLAP) data for three regions of the world. An another example, a large diversified company may have various sets of data sources for each of their departments, such as accounting, inventory, and sales, and one common data source for company wide information, such as product pricing information.

For a medium or large enterprise, multiple computer systems may be set up to support one or more applications (e.g., analytics application) and these systems may have access to different data sources. Users may then be specifically assigned to each system, with each user typically having access to only one system. Each system may further be configured to run against one set of data sources. For an analytics system, a data source may be a data warehouse system for a backend database, which is sometimes referred to as a data warehouse/OLAP (DW/OLAP). For a system that supports some other enterprise application, a data source may be other types of relational database management system. Each system would then obtain the necessary data from the assigned data warehouse system for computation, aggregation, and presentation to its users.

Conventionally, an enterprise may set up multiple analytics systems (e.g., for different locales), and each analytics system (i.e., each installation that includes an analytics server) may be configured to run against one data warehouse system. The target data warehouse system is typically fixed for each analytics system and all users assigned to this system would then use the same data warehouse for their queries.

This multi-system implementation with fixed data sources is undesirable for several reasons. First, there are administrative overhead costs associated with the need to maintain multiple systems. Second, the users' ability to move across systems is normally restricted. Because each system only has access to certain designated data sources, the users are correspondingly limited to only the data stored in those data sources.

For many enterprises, it may be highly desirable to be able to share certain data more freely among users. For example, it may be advantageous to store product information and other common data in a single backend database that can be accessible to all users. In addition, it may also be desirable to direct or channel users to only the data stores that are pertinent to these users. For example, customer information and other region-specific data may be stored in different backend databases, and it would be desirable to be able to direct each user to the specific data source that stores the database applicable to that user.

As can be seen, techniques that can provide the above features are highly desirable. Moreover, the implementation to provide these features should be both simple, so that little administrative overhead is required, and flexible, so that users may be easily directed to their data stores.

SUMMARY OF THE INVENTION

Techniques are provided herein to dynamically select data sources for users and to direct queries for the users to the proper data sources. These techniques can provide various benefits, as described below.

An embodiment of the invention provides a computer program product operative to support dynamic selection of data sources for users and comprising a computer-usable medium having embodied therein computer-readable program codes. The codes receive user information for each user, which may be identification information (e.g., user name) or selection information for a specific data source. The codes then determine a data source designated to be accessible and used for each user based on the user information. This may be achieved with the use of a look-up table or by running a query with the user information against the data sources to obtain the identity (e.g., the logical name) of the designated data source. The codes can then set a data source variable for each user to the identity of the designated data source. This variable may be session-specific and valid only for the current session.

Thereafter, the codes direct the queries for each user to the user's designated data source. This may be achieved by determining database connection information for the designated data source (which may be stored in a configuration file or an equivalent) and using this database connection information to direct the queries to the designated data source.

The invention further provides computer program products, methods, and systems capable of implementing various aspects, embodiments, and features of the invention, as described in further detail below.

The foregoing, together with other aspects of this invention, will become more apparent when referring to the following specification, claims, and accompanying drawings.

BRIEF DESCRIPTION OF THE DRAWINGS

FIG. 4 is a diagram illustrating a data structure that may be used to determine the designated data sources for users of a system;

DESCRIPTION OF THE SPECIFIC EMBODIMENTS

Figure 1:
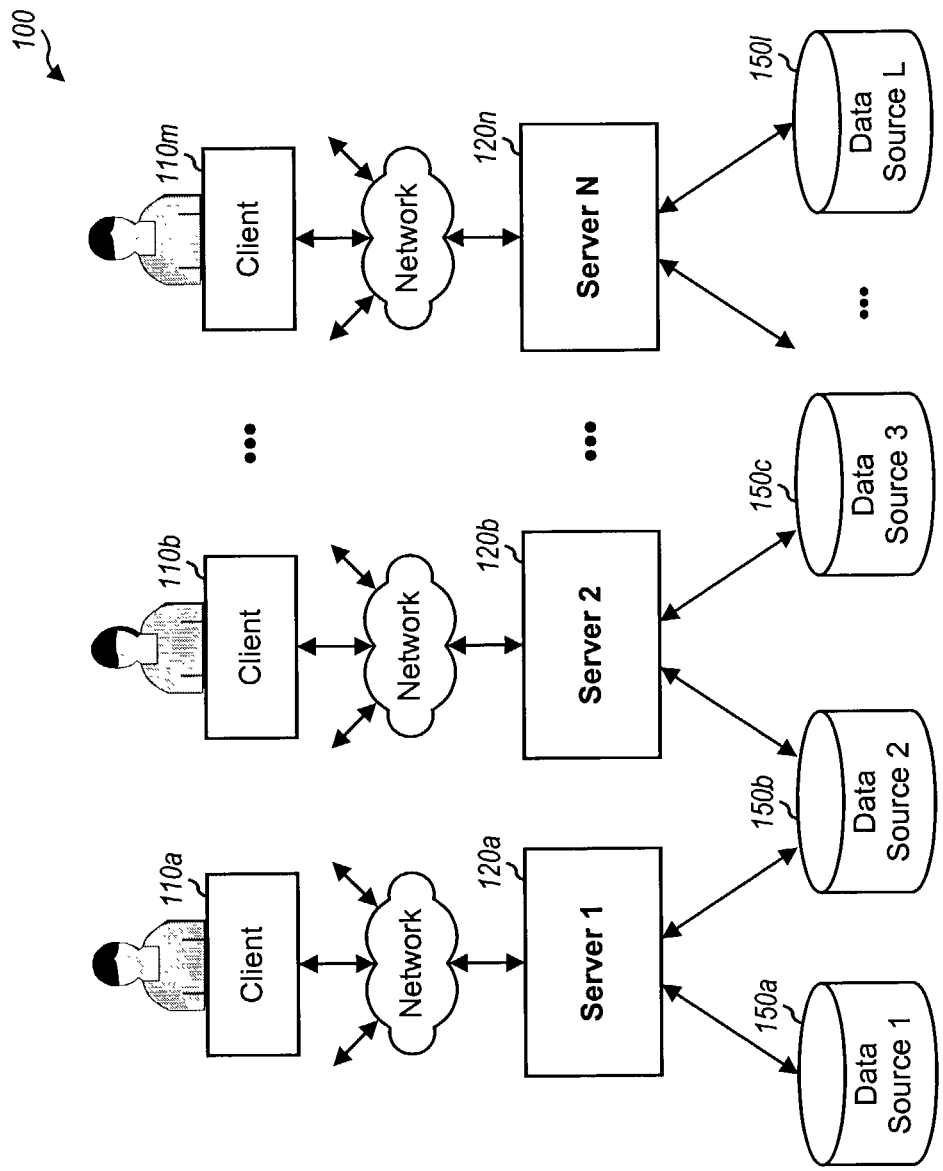
FIG. 1 is a diagram of a multi-system implementation with fixed data sources.

FIG. 1 is a diagram of a multi-system implementation 100 with fixed data sources. Implementation 100 includes a number of servers 120. Each server 120 couples to and is only able to access data from a respective set of one or more designated data sources 150. Multiple servers 120 may also couple to and share data from the same data source (e.g., data source 150b).

As used herein, a data source may be any source data such as a transaction database, a data warehouse, a file, a spreadsheet, and so on. A data source may also be a data warehouse system that stores transaction data specifically structured for querying and reporting. Whereas a database may be accessed and updated (i.e., read and write) by software applications as needed, a data warehouse typically includes a copy of the data from one or more databases and is normally intended to be accessed but not updated. The data in the data warehouse may be accessed by certain applications, such as analytics, for processing and reporting.

Each server 120 may be assigned a number of users. Each user may access the assigned server via a client machine 110 but is normally not able to access other servers. Thus, each user is only able to access the data stored in the data sources accessible by the assigned server. For example, the user on client machine 110a is able to access data from only data sources 150a and 150b, the user on client machine 110b is able to access data from only data sources 150b and 150c, and so on. Each server may thus be viewed as an independent system that serves its assigned users and has access to a specific set of data sources.

Multi-system implementation 100 has several disadvantages. First, there are administrative overhead costs associated with maintaining multiple servers, especially keeping them synchronized with each other. Second, if the users are not able to move across servers, then their access to data is also restricted. Third, for analytics systems, users across the servers cannot share analytical reports or the metadata with each other. For example, if a user on server 1 creates a new report, which he/she would like to share with users of server 2, this is not an easily accomplished task.

Techniques are provided herein to dynamically direct or switch users to the proper data sources. These techniques can ameliorate the disadvantages described above for multi-system implementation 100.

Figure 2A:
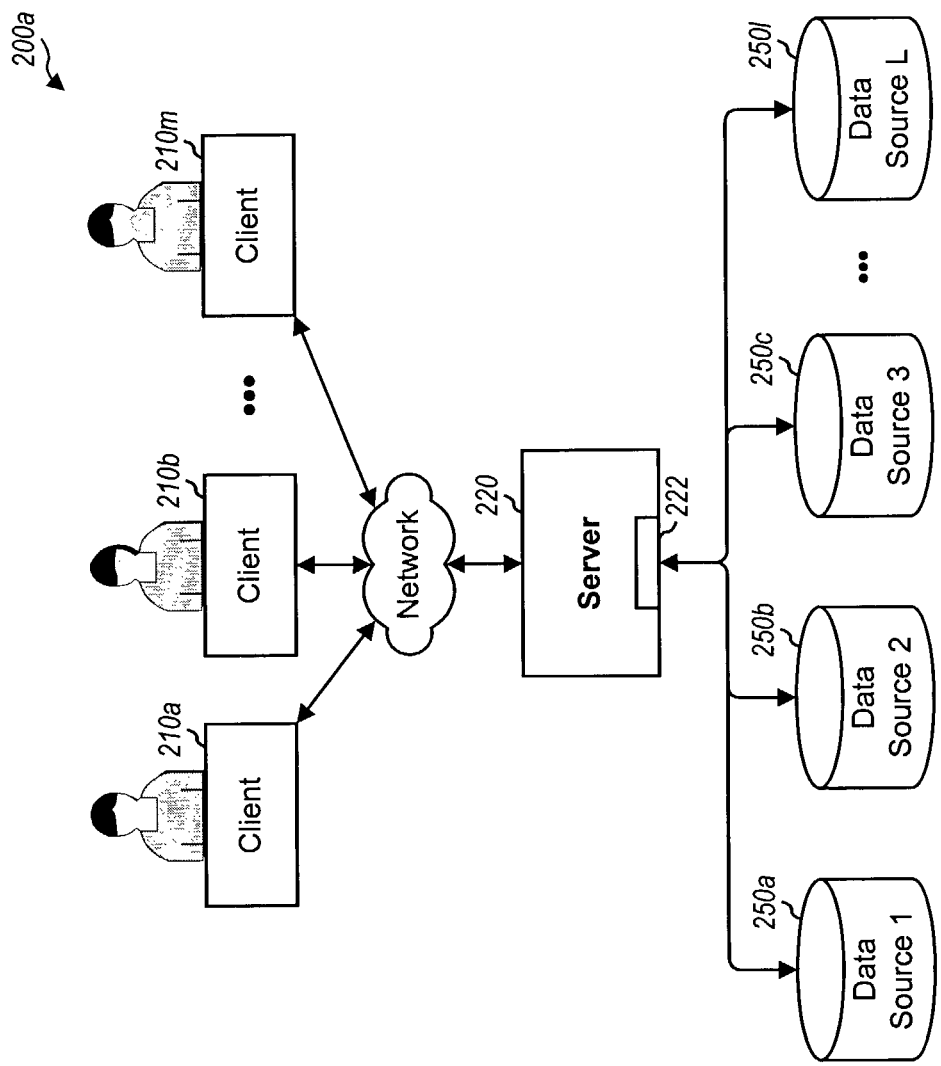
FIGS. 2A-2C are diagrams of three systems with dynamic data source selection.

FIG. 2A is a diagram of a system 200a with dynamic data source selection. In this embodiment, system 200a includes a single server 220 that couples to and is able to access data from a number of data sources 250a through 250l. These data sources may be associated with different geographic regions and/or different subject areas. These data sources might also have been assigned to different servers for the system implementation shown in FIG. 1.

A number of users may gain access to server 220 via a number of client machines 210. Each user may be granted access to a respective set of one or more data sources that contains data pertinent to that user. Different users may thus be given access to different data sources. The request for each user would then be processed by server 220 and sent to the proper data source by a data source switch 222 within the server. A design for the data source switch is described in further detail below.

Figure 2B:
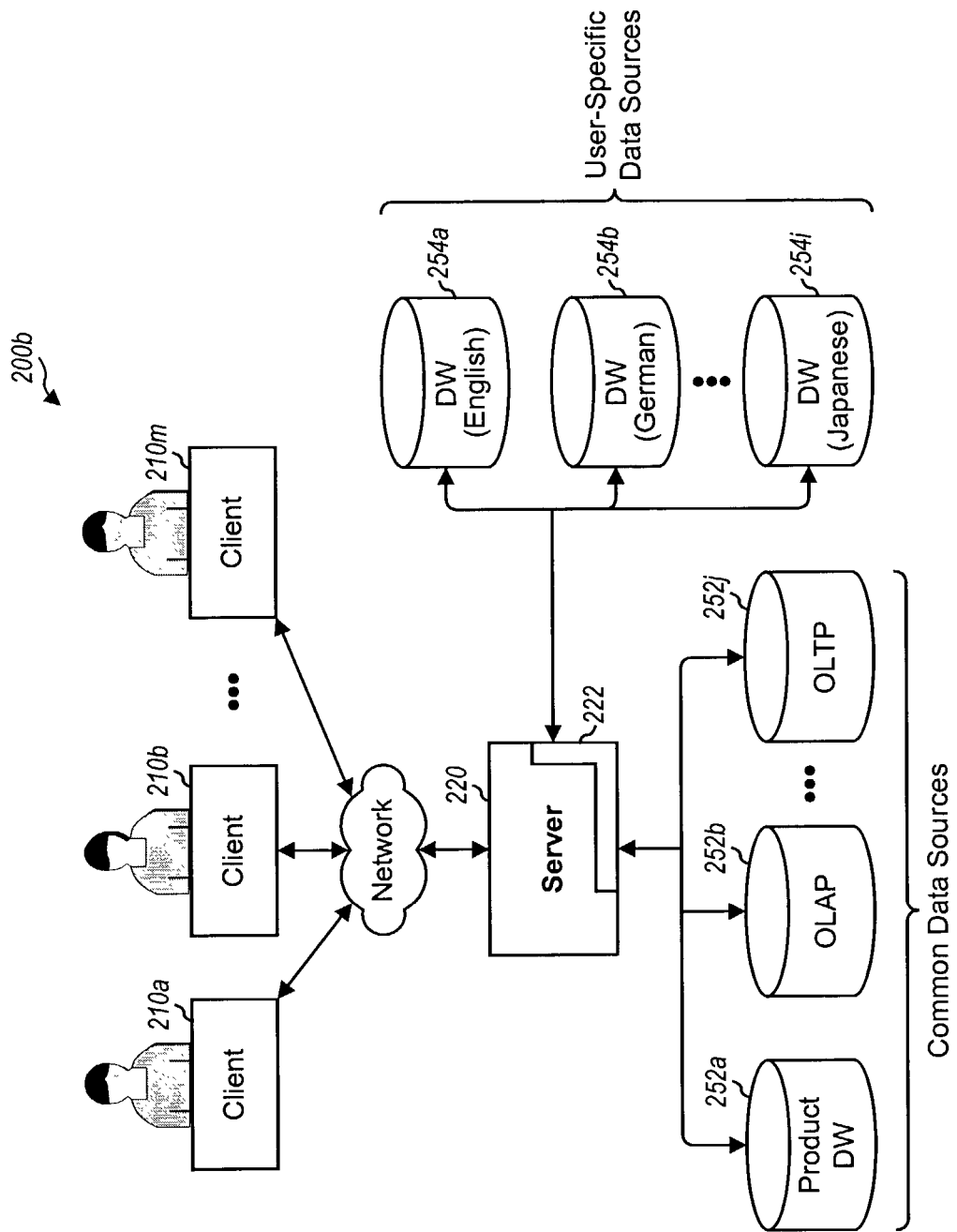

FIG. 2B is a diagram of another system 200b with dynamic data source selection. In this embodiment, system 200b also includes a single server 220 that couples to and is able to access data from a number of data sources 252 and 254.

The data sources may store common databases intended to be accessible by all users of the system and user-specific databases intended to be accessible only by designated users. The common data sources may include, for example, a data warehouse (DW) 252a for storing product information, a data warehouse 252b for storing online analytical processing (OLAP) data, a database 252j for storing on-line transaction processing (OLTP) data, and so on. The user-specific data sources may store data for different regions, subject areas, languages, or any combination thereof. For example, the user-specific data sources may include a data warehouse 254a for storing data in English, a data warehouse 254b for storing data in German, a data warehouse 254i for storing data in Japanese, and so on.

For system 200b, each user may be given access to all common data sources 252 and to one or more user-specific data sources 254 containing data needed by that user. The queries or requests for each user would then be processed by server 220 and routed to the proper common or user-specific data source by data source switch 222 within the server.

System 200b may be advantageously used for a server that supports a software application with multi-lingual capabilities. One such multi-lingual application is described in detail in U.S. patent application Ser. No. 10/185,180, entitled "Single Server Instance, Multi-Lingual Applications Based on Loosely Coupled Metadata and Presentation Layers," filed Jun. 27, 2002, assigned to the assignee of the present application and incorporated herein by reference. A multi-lingual application can support users in multiple languages based on a single installation of the application, which can provide setup and administration benefits. The data for different languages may be stored in different data sources (e.g., data sources 254a through 254i). System 200b may then be able to direct each user to the proper data source based on the language of the user. In this way, "data inertia effect" is avoided since it would not be necessary to convert code page databases stored in different data sources to Unicode or some other common format. Additionally, for an analytics system, users can utilize the same report to show different data (in perhaps their preferred language) in conjunction with some common data.

Figure 2C:
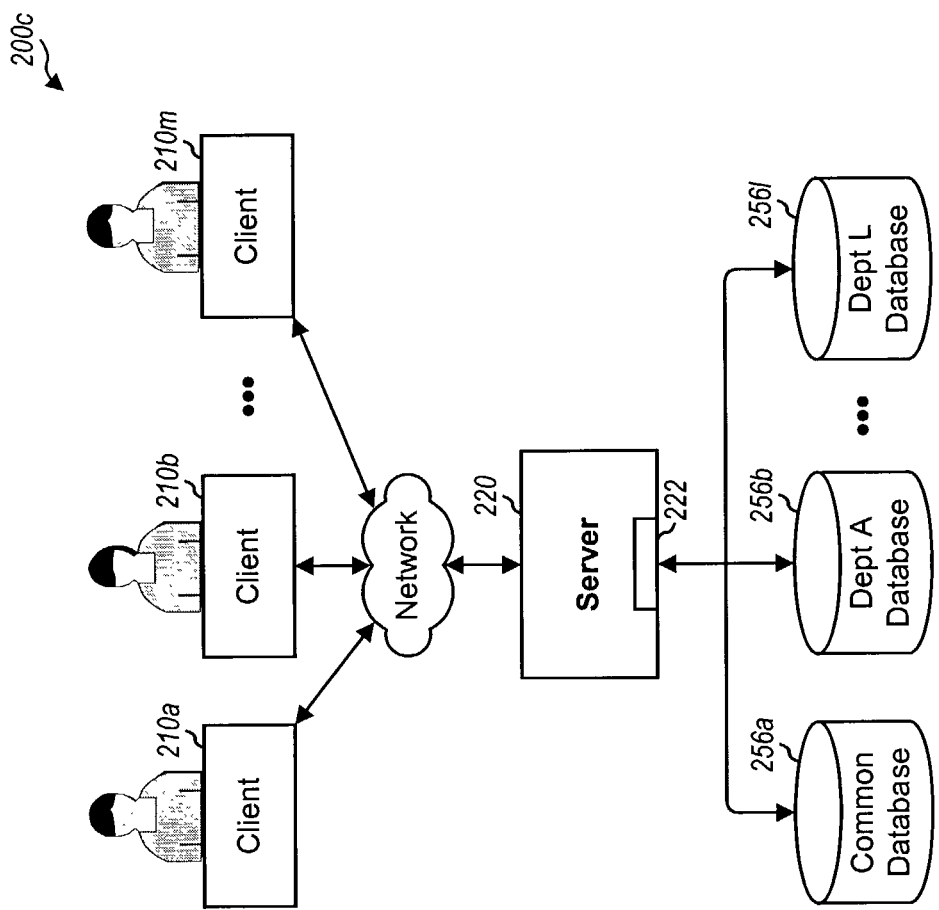

FIG. 2C is a diagram of yet another system 200c with dynamic data source selection. In this embodiment, system 200c also includes a single server 220 that couples to and is able to access data from a number of data sources 256a through 256l. One or more data sources (e.g., data source 256a) may be designated to store common or public databases that may be accessed by all users. Other data sources (e.g., data sources 256b through 256l) may be designated to store restricted or private databases that may be accessed only by authorized users. For example, one private data source may be maintained for each department of the enterprise and may be accessible only by users within the department.

System 200c may be advantageously used, for example, for a large enterprise whereby data for the system is distributed in multiple public and private data sources, and access to private data sources needs to be restricted. System 200c would then allow a central application to span both public and private data sources. For example, an analytic application may use different target, budget, plan numbers that are stored in different public/private data sources depending on the user.

Systems 200a through 200c may provide various benefits over system 100. First, setup and administrative costs may be saved by maintaining a single integrated system instead of multiple independent systems such as that shown in FIG. 1. Moreover, data may be more easily shared among users.

For each of systems 200a through 200c, a data source switch determines for each user the one or more data sources designated to be accessible by and used for that user. Thereafter, queries and requests for the user would be directed to the designated data source(s). The data source switch thus has the ability to direct the same queries sent by different users to different data stores. Specific details for an implementation of the data source switch are described below.

Figure 3:
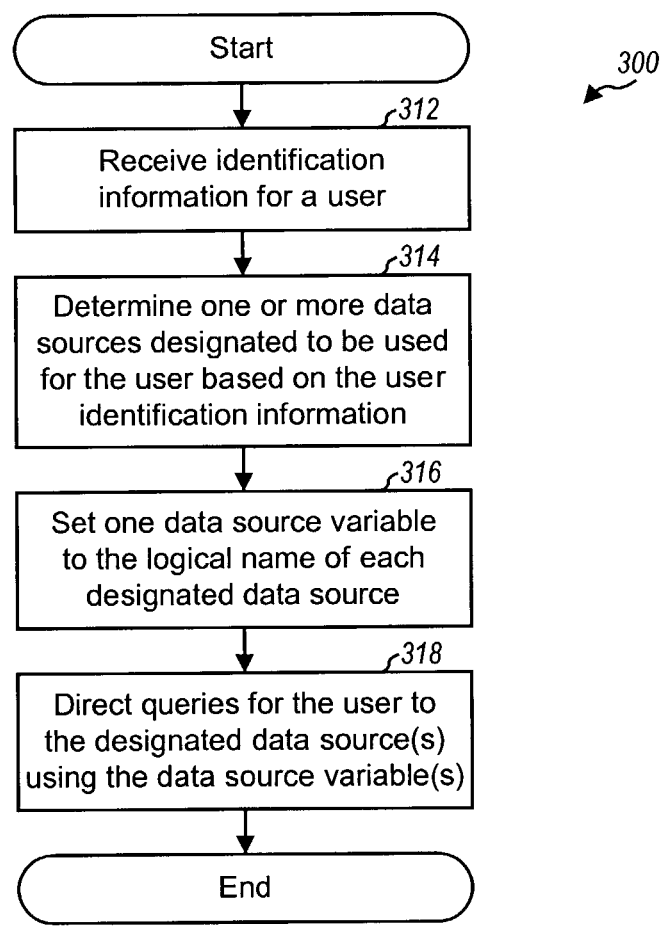
FIG. 3 is a flow diagram of an embodiment of a process for dynamically selecting data sources for users and directing queries to the proper data sources.

FIG. 3 is a flow diagram of an embodiment of a process 300 for dynamically selecting data sources for users and directing queries for the users to the proper data sources. For simplicity, the processing for only one user is shown in FIG. 3.

Initially, identification information for the user is received (step 312). The user identification information may include one or more types of information such as login information (e.g., user name), user configuration information (e.g., information from the user's browser or client machine), or any other information that may be used to identify the user. A specific data source (or multiple data sources) designated to be accessible by the user is then determined based on the user identification information (step 314). This may be achieved via a look-up table or some other data structure. Alternatively, the one or more designated data sources for the user may be determined by running a query with the user identification information, as described in further detail below. Each designated data source for the user is typically identified by a unique logical name assigned to that data source.

One data source variable is then set to the logical name of each designated data source (step 316). Thus, there may be several data source variables associated with the user. In an embodiment, the data source variable(s) for each user are set during a session, typically at the start of the session. As used herein, a session covers the time that a user is connected to an application (after authenticating his/her username and password) until such time that the user exits the application, such that the user cannot interact with the application without having to reconnect. In an embodiment, the data source variable(s) used only for the user for the current session and are thus considered a session-specific variable.

Thereafter, queries and other processing for this user are directed to the designated data source(s) using the data source variable(s) (step 318). The data source variables, once set, thus act like a switch that directs the user to the proper data source.

The embodiment described above determines the designated data sources for the user based on the user identification information (e.g., user name). In another embodiment, the user may be allowed to select the specific data sources to use. In that case, user selection information would be received in step 312 instead of user identification information. This user selection information identifies one or more specific data sources to use for the user and may be obtained via a select box, an input box, or by some other means. In general, the specific data source(s) to use for each user are selected based on "user information", which may be identification information or selection information.

The techniques for dynamically selecting data sources for users and directing queries to the proper data sources may be implemented in various manners. For clarity, a specific implementation is described below.

FIG. 4 is a diagram illustrating a data structure that may be used to determine the designated data sources for users of a system. For this embodiment, a data source name (DSN) look-up table 410 includes two columns: a user ID column 412 and a data source name column 414. User ID column 412 includes a listing of the user IDs of the users of the system. DSN column 414 includes the logical name of the data sources designated to be used for the users listed in column 412. Table 410 includes one entry 416 for each user, with the user ID of the user being stored in column 412 and the logical name of the designated data source for the user being stored in column 414.

Different and/or additional information may also be included in the DSN look-up table, and this is within the scope of the invention. Normally, for data source switching, only the logical name of the data source assigned to the user needs to be stored in the look-up table. However, any information specific to the user may also be stored in the look-up table, such as the language environment that the user prefers. In general, the table normally includes one column for information used to uniquely identify each user and another column for information used to specify the one or more designated data sources for the user.

The DSN look-up table in FIG. 4 represents one specific data structure that may be used to determine the designated data source for each user. Other data structures may also be used and this is within the scope of the invention. For example, a table may be designed with one entry for each data source. Each entry would then include the user IDs of all users designated to use that data source. The designated data source for each user may then be determined by searching for the user's user ID in each row of the look-up table. This data structure may require less storage to implement than DSN look-up table 410.

Figure 5:
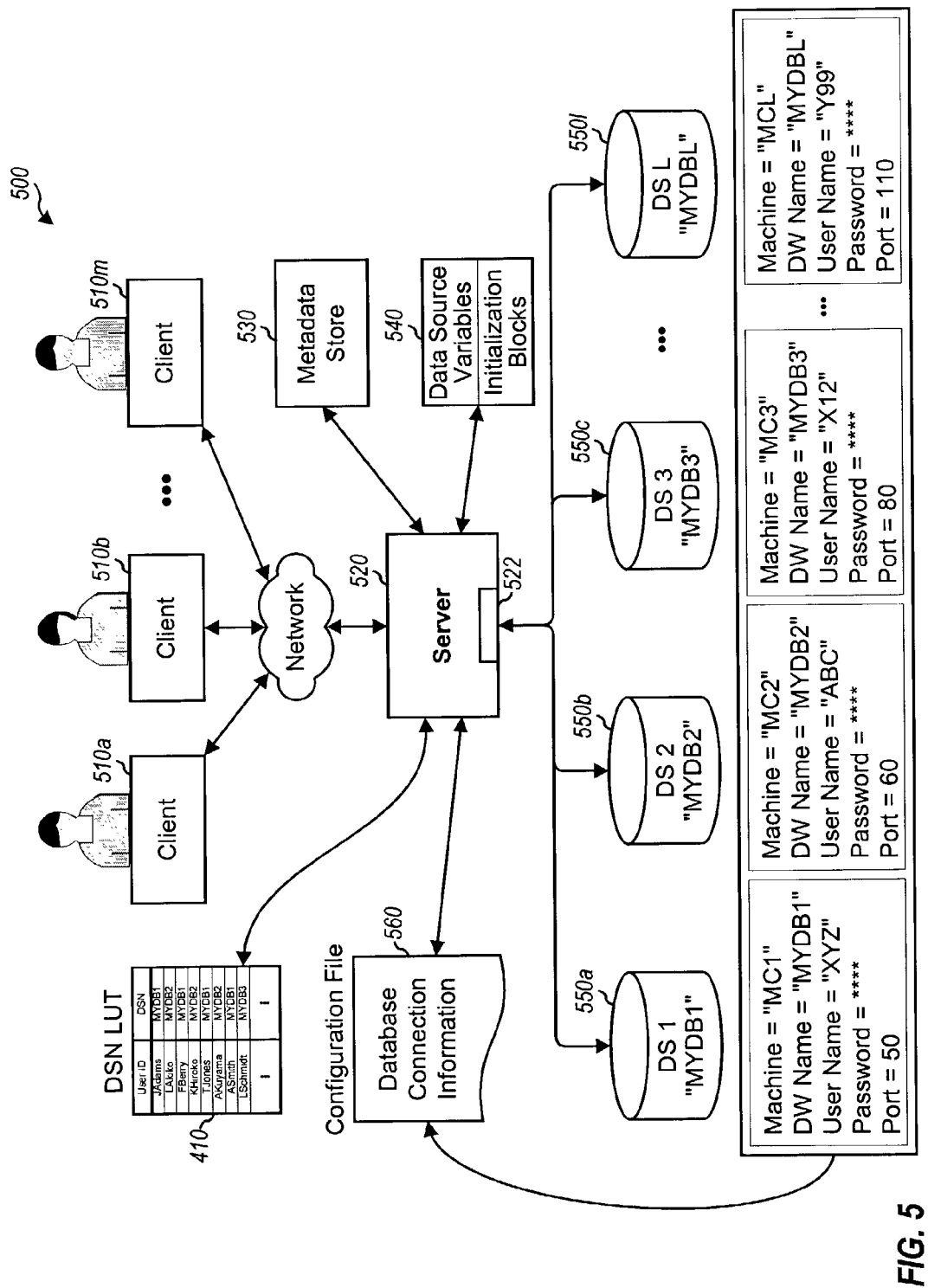
FIG. 5 is a diagram of an embodiment of a system that supports dynamic data source selection and query routing.

FIG. 5 is a diagram of an embodiment of a system 500 that supports dynamic data source selection and query routing. For this embodiment, system 500 includes a server 520 that interacts with users via client machines 510. Server 520 further couples to a number of data sources (DS) 550 that store data for the system. Each of these data sources may be a common data source accessible by all users or a user-specific data source accessible only by designated users.

Server 520 also couples to a metadata store 530 that stores information about the application environment, data modeling, physical schemas of the databases accessible by the server, database connectivity, and so on. This information is used by server 520 to perform various processing.

A run-time store 540 stores the data source variables for active users (i.e., those with active sessions) and initialization blocks for these variables. The initialization blocks may be invoked to initialize the data source variable(s) for each new user. The data source variables in run-time store 540 are updated as users log on and log off the system.

The initialization blocks may be implemented in various manners. In one embodiment, the initialization blocks access DSN look-up table 410 for each new user to determine the DSN of the designated data source for that user.

In another embodiment, the initialization blocks comprise SQL queries. When a new user logs on to the system, an SQL query is run with the user identification information (e.g., user name) against tables stored in the data sources to gather stored information regarding the user and to obtain the DSN of the data source assigned to that user. The table in each data source would include information that identifies all users able to access that data source.

In yet another embodiment, the initialization blocks comprise SQL queries that fetch the information from the DSN look-up table into the server. A SQL query for a new user may be performed with an SQL statement such as "SELECT User_Name, DSN_Name FROM DSN_Table WHERE User=<Name of User>". The name of the new user is inserted dynamically into the SQL statement. The initialization block executes this SQL statement and sets the data source variable based on the returned value.

For all embodiments, the data source variable for the new user is then set to the DSN of the designated data source.

The data source variable for each user is typically set or initialized at the start of each session. For some embodiments, the data source variable may also be changed during the session. For example, the user identification information may be used to determine the data source designated for the user. Thereafter, the user may be able to select another data source, if authorized, via selection menu.

Each data source 550 is normally associated with physical database connection information that is used to gain access to that data source. This database connection information may include the following:

- machine name (e.g., "MC1")—this is the computer name or NetBIOS name of the server that services queries for the data source;
- logical name (e.g., "MYDB1")—this is the name assigned to the data source and may be used to more conveniently refer to the data source;
- user name (e.g., "XYZ")—this is the name used to access the data source server;
- password—this is the password needed to access the data source server; and
- port number (e.g., "50")—this is the number for the (e.g., TCP/IP) connection between server 520 and the data source server.

The database connection information may also include other database specific information that helps the server connect to the proper data source.

The logical names are names assigned to the data sources, typically by an administrator, for ease of identifying the data sources. The database connection information maps the logical names for the data sources to their connection information, and thus provides aliasing of the physical database connections. The database connection information may thus be viewed as metadata for the physical layer of the data sources. This database connection information is used by server 520 to direct queries for the users to the proper data sources.

In an embodiment, a configuration file 560 is used to store the database connection information. The configuration file may be stored in a manner such that is easily accessible to server 520.

As a specific example, using the DSN table shown in FIG. 4, the data source name for user "JAdams" may be determined to be "MYDB1". The data source variable for this user may then be set as:

User_Session.DSN=MYDB1

Thereafter, each query for this user may be directed to the designated data source using the data source variable. For example, the data source for the queries for this user may be specified by the following expression:

data source=ValueOf(User_Session.DSN)

This expression is different from a conventional implementation whereby the data source is fixed, in which case the data source for this user's queries may be specified as "data source=MYDB1".

The data source variable for the user may thus be set or initialized to the DSN of the designated data source, which may be any one of a number of data sources. The value of the data source variable is obtained by the "ValueOf" operation. The configuration file is then consulted to obtain the physical database connection information for the DSN value obtained from the data source variable.

The data source switch may thus be implemented with software modules and supporting look-up table/configuration file. This implementation can be both simple, so that little administrative overhead is required, and flexible, so that users may be easily directed to the pertinent data stores. However, other implementations of the data source switch may also be contemplated, and this is within the scope of the invention.

Each data source may be associated with its own physical schema that defines the format and meaning of the data stored on the data source. The physical schema for a given data source may also be a subset of the physical schema for another data source. The physical schema is thus also dynamically selected by the dynamic selection of these data sources.

The selection of data source connections (e.g., within the connection pool maintained by each data source) is session-specific. This session-specific context may also drive the selection of the table and column names within a connection.

System 500 provides a mechanism through which the designated data source for each user can be dynamically determined when the user logs on to the system. This data source can be determined based on user identification information (e.g., login information) or user selection information, and may be chosen from among many data stores.

The ability to dynamically select data source can provide several additional benefits not noted above. First, only one copy of the metadata that drives queries for different users may need to be maintained. Second, one server can run against a number of different data sources. This is especially beneficial for a global enterprise that may have data warehouses for different languages (e.g., English, German, Japanese, and so on). Third, the same queries can be run against different target data warehouses, depending on the data source variables. For example, a query made by a Japanese user may be shared by a German user, and so on. However, the results returned to these two users may be different because they are obtained from different data sources and may also be displayed in different languages (e.g., they may be in Japanese for the Japanese user and in German for the German user).

The techniques described herein may also be used to support centralized application development against multiple "horizontal" and "vertical" data sources. Horizontal data sources typically store data that may be used across different industries, and vertical data sources typically store data intended to be used for specific industry (e.g., financial, insurance). Using the dynamic data source selection techniques described herein, depending on the particular application under development, queries may be directed to the proper horizontal or vertical data sources based on data source variables.

The techniques described herein may be used for various software applications. One important class of software application that can benefit from the techniques described herein is analytics application. Conventionally, each analytics system is configured to run against one data warehouse system. The target data warehouse system is fixed for the system and all users of the system would use the same data warehouse for their queries. However, with the techniques described herein, the one data warehouse for each user may be dynamically determined when the user logs on to the system. This then provides various benefits as noted above.

Figure 6:
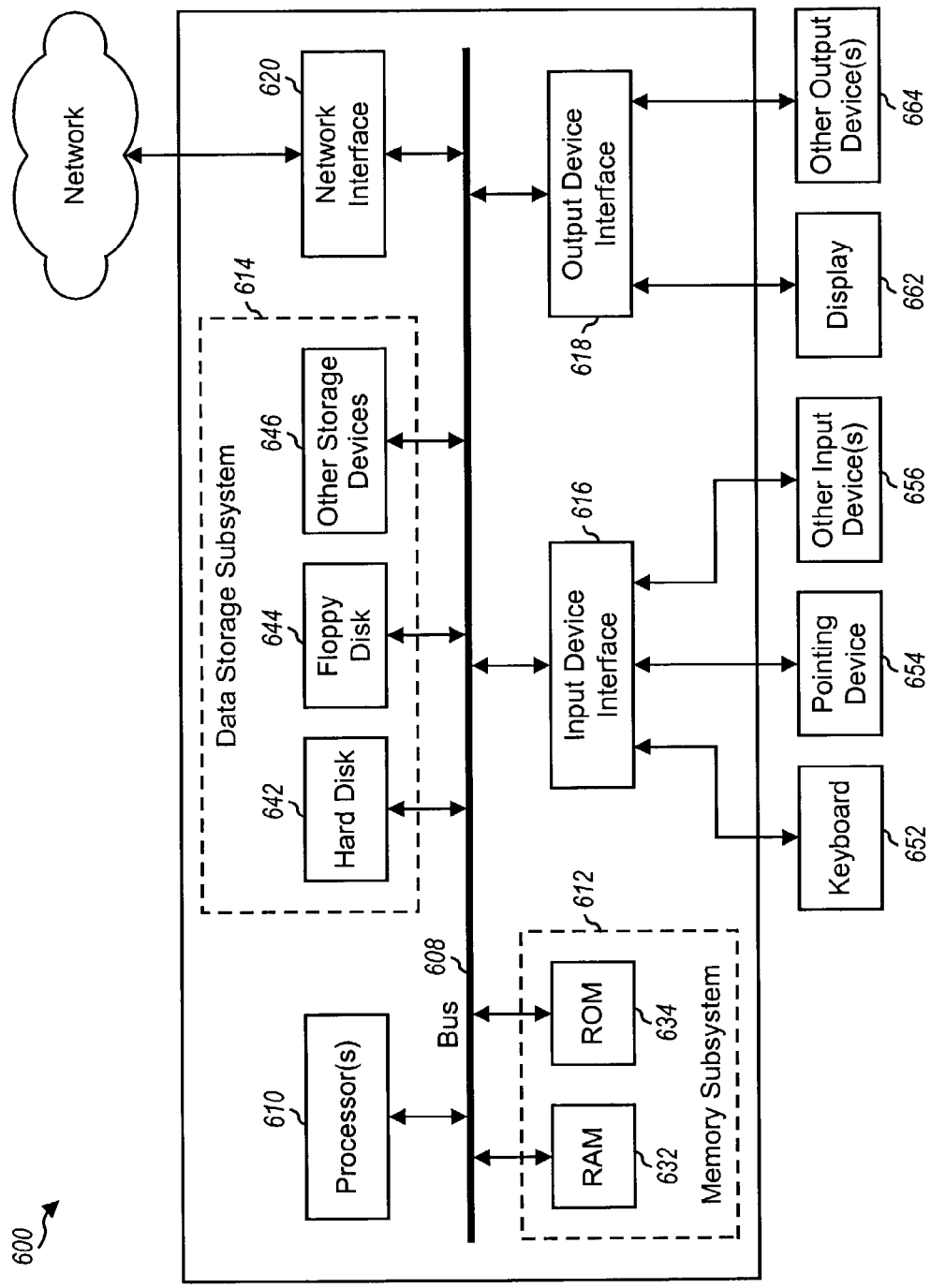
FIG. 6 is a block diagram of a computer system.

FIG. 6 is a block diagram of an embodiment of a computer system 600 that may be used to implement server 220 in FIGS. 2A through 2C and server 520 in FIG. 5. System 600 includes a bus 608 that interconnects major subsystems such as one or more processors 610, a memory subsystem 612, a data storage subsystem 614, an input device interface 616, an output device interface 618, and a network interface 620. Processor(s) 610 perform many of the processing functions for system 600 and communicate with a number of peripheral devices via bus 608.

Memory subsystem 612 may include a RAM 632 and a ROM 634 used to store codes and data that implement various aspects of the invention. For example, memory subsystem 612 may be used for metadata store 530, run-time store 540, DSN table 410, and/or configuration file 560 in FIG. 5. Data storage subsystem 614 provides non-volatile storage for program codes and data, and may include a hard disk drive 642, a floppy disk drive 644, and other storage devices 646 (e.g., a CD-ROM drive, an optical drive, a removable media drive, and so on). Data storage subsystem 614 may also be used for the metadata store, run-time store, DSN table, and/or configuration file.

Input device interface 616 provides interface with various input devices such as a keyboard 652, a pointing device 654 (e.g., a mouse, a trackball, a touch pad, a graphics tablet, a scanner, or a touch screen), and other input device(s) 656. Output device interface 618 provides an interface with various output devices such as a display 662 (e.g., a CRT or an LCD) and other output device(s) 664. Network interface 620 provides an interface for system 600 to communicate with other computers coupled to network 120.

Many other devices or subsystems (not shown) may also be coupled to system 600. In addition, it is not necessary for all of the devices shown in FIG. 6 to be present to practice the invention. Furthermore, the devices and subsystems may be interconnected in configurations different from that shown in FIG. 6. The source codes to implement certain embodiments of the invention may be operatively disposed in memory subsystem 612 or stored on storage media such as a hard disk, a floppy disk, or a CD-ROM that is operative with a CD-ROM player.

The foregoing description of the specific embodiments is provided to enable any person skilled in the art to make or use the present invention. Various modifications to these embodiments will be readily apparent to those skilled in the art, and the generic principles defined herein may be applied to other embodiments without the use of the inventive faculty. Thus, the present invention is not intended to be limited to the embodiments shown herein but is to be accorded the widest scope consistent with the principles and novel features disclosed herein, and as defined by the following claims.

What is claimed is:

1. A computer program product comprising:
    a first set of instructions, executable on a computer system, configured to receive user identification information for each user of a plurality of users at a start of a current session of each user;
    a second set of instructions, executable on the computer system, configured to dynamically determine a plurality of data sources designated for each user based on the user identification information, wherein the plurality of data sources comprises
        a common database that is accessible by all of the plurality of users, and
        at least one user-specific database that is configured to be accessed by only designated users;
    a third set of instructions, executable on the computer system, configured to set a data source variable for each user, wherein
        the data source variable comprises information configured to identify the data sources designated for the user, and
        the data source variable is a session-specific variable that is utilized by the user only for the current session;
    a fourth set of instructions, executable on the computer system, configured to provide a user-specific data source selection interface to each user so as to enable each user to select one or more user-specific data sources, wherein said fourth set of instructions is configured to determine if a user is authorized to select another data source and to receive, after the start of the current session and after the data source variable is set, a user selection identifying at least one data source which is different from the data sources designated for the user and associated with the data source variable;
    a fifth set of instructions, executable on the computer system, configured to dynamically change the data source variable during the current session so that the data source variable comprises information configured to identify one or more data sources identified by the user selection;
    a sixth set of instructions, executable on the computer system, configured to direct queries for each user to the data sources designated for the user or identified by the user selection based on the identity of the data sources set in the data source variable, wherein said sixth set of instructions is configured to direct identical queries for different users to different data sources even when results returned from the data sources in response to the identical queries are different; and
    non-transitory computer readable storage media, wherein said first set of instructions, said second set of instructions, said third set of instructions, said fourth set of instructions, said fifth set of instructions, and said sixth set of instructions are encoded in said non-transitory computer readable storage media.

2. The computer program product of claim 1, wherein the user identification information for each user comprises login information.

3. The computer program product of claim 1, wherein the user identification information and identity of the designated data sources for each user are stored in a look-up table.

4. The computer program product of claim 1, wherein the identity of each of the data sources set in the data source variable for each user is only valid for the current session.

5. The computer program product of claim 1, wherein the second set of instructions comprises:
    a first subset of instructions, executable on a computer system, configured to execute a query for each user with the user identification information to obtain identities of the data sources designated for the user.

6. The computer program product of claim 5, wherein the second set of instructions comprises:
    a second subset of instructions, executable on a computer system, configured to access a look-up table with the user identification information to obtain identities of the data sources designated for the user.

7. The computer program product of claim 1, wherein the sixth set of instructions is further configured to:
    determine database connection information for the data sources designated for or selected by each user, and wherein the queries for the user are directed to the designated or selected data sources based on the database connection information.

8. The computer program product of claim 7, wherein the database connection information for the data sources is stored in a configuration file.

9. The computer program product of claim 1, wherein the computer program product is installed in a single server.

10. A method implemented on a computer system comprising one or more processors, the method comprising:
    receiving user identification information for each user of a plurality of users at a start of a current session of each user;
    dynamically determining a plurality of data sources designated for each user based on the user identification information, wherein the plurality of data sources comprises a common database that is accessible by all of the plurality of users, and at least one user-specific database that is configured to be accessed by only designated users;

setting a data source variable for each user, wherein
- the data source variable comprises information configured to identify the data sources designated for the user, and
- the data source variable is a session-specific variable that is utilized by the user only for the current session;

providing a user-specific data source selection interface to each user so as to enable each user to select one or more user-specific data sources, determining if a user is authorized to select another data source, and receiving, after the start of the current session and after the data source variable is set, a user selection identifying at least one data source which is different from the data sources designated for the user and associated with the data source variable;

dynamically changing the data source variable during the current session so that the data source variable comprises information configured to identify one or more data sources identified by the user selection;

directing queries for each user to the data sources designated for the user or identified by the user selection based on the identity of the data sources set in the data source variable, wherein said directing directs identical queries for different users to different data sources even when results returned from the data sources in response to the identical queries are different.

11. The method of claim 10, wherein the user identification information for each user comprises login information.

12. The method of claim 10, wherein the user identification information and identity of the designated data sources for each user are stored in a look-up table.

13. The method of claim 10, wherein the identity of each of the data sources set in the data source variable for each user is only valid for the current session.

14. The method of claim 10 further comprising:
executing a query for each user with the user identification information to obtain identities of the data sources designated for the user.

15. The method of claim 14 further comprising accessing a look-up table with the user identification information to obtain identities of the data sources designated for the user.

16. The method of claim 10 further comprising determining database connection information for the data sources designated for or selected by each user, and wherein the queries for the user are directed to the designated or selected data sources based on the database connection information.

17. The method of claim 16, wherein the database connection information for the data sources is stored in a configuration file.

* * * * *

UNITED STATES PATENT AND TRADEMARK OFFICE
CERTIFICATE OF CORRECTION

| | | |
|---|---|---|
| PATENT NO. | : 8,799,489 B2 | Page 1 of 1 |
| APPLICATION NO. | : 10/186328 | |
| DATED | : August 5, 2014 | |
| INVENTOR(S) | : Suen et al. | |

It is certified that error appears in the above-identified patent and that said Letters Patent is hereby corrected as shown below:

In the Specification

In column 4, line 16, delete "2002," and insert -- 2002, now U.S. Patent no. 7,836,403, which issued on Nov. 16, 2010, --, therefor.

Signed and Sealed this
Third Day of March, 2015

Michelle K. Lee
*Deputy Director of the United States Patent and Trademark Office*